Figure 1:
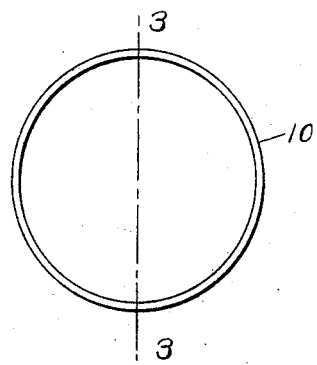

No. 861,597. PATENTED JULY 30, 1907.
J. MERRITT.
MANUFACTURE OF GASKETS.
APPLICATION FILED DEC. 29, 1906.

3 SHEETS—SHEET 1.

Witnesses:
Jannette S. Ellsworth
H. Mallner

Inventor:
Joseph Merritt
By Wm H Honiss Atty

No. 861,597. PATENTED JULY 30, 1907.
J. MERRITT.
MANUFACTURE OF GASKETS.
APPLICATION FILED DEC. 29, 1906.
3 SHEETS—SHEET 2.
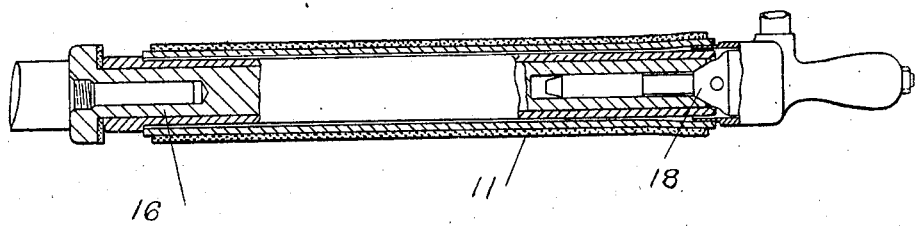
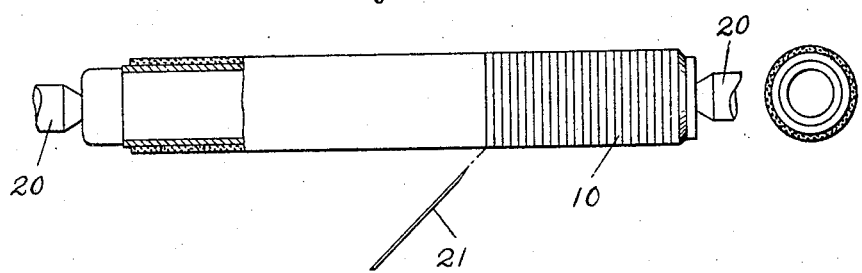 
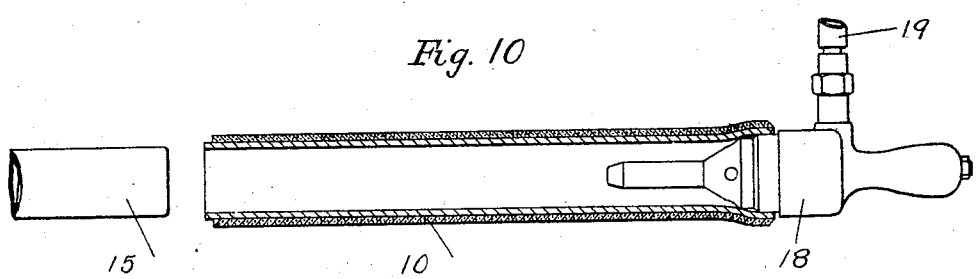
Witnesses:
Inventor:
Joseph Merritt
By W. H. Honiss. Atty No. 861,597. PATENTED JULY 30, 1907.
J. MERRITT.
MANUFACTURE OF GASKETS.
APPLICATION FILED DEC. 29, 1906.
3 SHEETS—SHEET 3.
Fig. 11
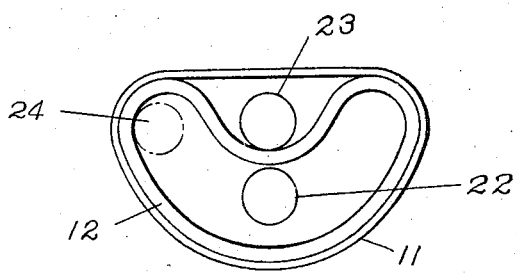
Fig. 12
Fig. 13
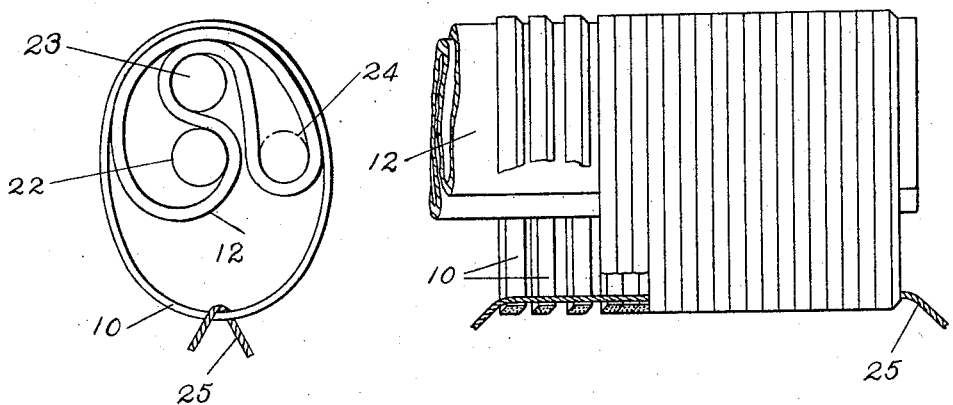
Witnesses:
Inventor:
Joseph Merritt
By Wm H Honiss. Atty

UNITED STATES PATENT OFFICE.

JOSEPH MERRITT, OF HARTFORD, CONNECTICUT, ASSIGNOR, BY DIRECT AND MESNE ASSIGNMENTS, OF ONE-HALF TO BEECH-NUT PACKING COMPANY, OF CANAJOHARIE, NEW YORK, A CORPORATION OF NEW YORK, AND ONE-FOURTH TO WILLIAM A. LORENZ AND ONE-FOURTH TO WILLIAM H. HONISS, BOTH OF HARTFORD, CONNECTICUT.

MANUFACTURE OF GASKETS.

No. 861,597.  Specification of Letters Patent.  Patented July 30, 1907.

Application filed December 29, 1906. Serial No. 349,965.

*To all whom it may concern:*

Be it known that I, JOSEPH MERRITT, a citizen of the United States, and a resident of Hartford, in the county of Hartford and State of Connecticut, have invented certain new and useful Improvements in Manufacture of Gaskets, of which the following is a full, clear, and exact specification.

This invention relates to improvements in the art of manufacturing ring gaskets from tubes of gasket material, which is usually india rubber, or a compound which includes a considerable amount of india rubber or similar flexible and elastic material.

The gaskets referred to are commonly used for effecting the hermetic sealing of various kinds of cans, jars and other receptacles used for the packing of food products. Where the cross-sectional form of the gaskets is such that they can be cut without waste from tubes or blanks of gasket material, that method of manufacture is the most expeditious and the least expensive. But it is attended by difficulties arising from the flexible and clinging character of the material of which such gaskets are made, especially in the better grades. These difficulties are encountered mainly in the operation of mounting or holding the tubes for cutting, and in cases where the tubes are mounted upon a mandrel, in removing the cut gaskets therefrom.

In practice, the tubes of gasket material are mounted upon a mandrel of a larger diameter than the normal diameter of the tubes to be cut, so as to utilize the constrictive action of the gasket material for holding it in place upon the mandrel while being cut. This avoids the use of mechanical contrivances for gripping or clamping the tube in place, while also leaving its entire area exposed; and thereby enables it all to be converted into gaskets, excepting a very small amount trimmed from each end of the tube. These mandrels are generally rotated while the gasket rings are separated from the tube one by one, by cutting through the wall of the tube at the intervals required to make the rings of the desired thickness. On account of the clinging and elastic character of the material it is necessary to have the cutting tool which is extremely thin and sharp entirely penetrate the wall of the tube, in order to fully separate the rings, thus bringing the cutting edge of the tool against or into the surface of the mandrel. In order to lessen the tendency to dull the keen edge of the tool by contact with the mandrel, the latter are sometimes made of wood. In other cases, especially where metal mandrels are employed they are covered with rubber or similar material, cemented or otherwise secured to the mandrel. In either case the repeated cuts of the tool score and roughen the surface upon which the gasket tube is mounted, thus increasing the difficulty of drawing or pushing or otherwise mounting the gasket tube thereon, and of renewing the cut gaskets therefrom.

In mounting a tube of flexible and elastic material upon a larger mandrel, particularly when the latter is covered with rubber or other soft material, or when the surface is scored by repeated cuttings, it is difficult to expand the tube equally, and difficult to confine the expansion to a radial or circumferential direction, the tendency being either to stretch or compress the material longitudinally and to an unequal extent at different portions of the surface of the tube. The constrictive action of the tube around the surface of the mandrel interferes with the free and uniform distribution of the material and holds it in a more or less unequally distributed condition while being cut. The result is that the material more or less unequally changes its form as the strains are released by the cutting away of the successive rings, resulting in the production of gaskets which are irregular in size or contour. The roughness of the mandrel surface and the clinging character of the gasket material also operate to prevent the expeditious removal of the cut rings from the mandrel. Moreover, when cut from the tube, the rings obviously lie in planes at right angles to the axis of the mandrel; and any attempt to remove them from the mandrel stretches them from their first form and increases their clinging hold upon the mandrel and upon each other, especially where the gaskets are of the acute angled character more particularly shown and described in this application, the interlapping conical face of the gaskets tending to telescope and wedge against each other and thus increase the difficulty of removing them. If the attempt is made to remove the gaskets by pushing the mandrel through a collar or bushing with the expectation that the gaskets will thus be kept at right angles to the mandrel and will thus be easily removed, it will be found that they will wedge and cling together to such an extent as will generally prevent their removal at all by such methods. In the present invention, these difficulties are overcome as to the mounting operation by a process which employs a mandrel and a removable flexible sleeve or lining which serves as a vehicle for the tube and the gaskets, assembling the sleeve and the tube independently of the mandrel, and then expanding the sleeve and the tube together outwardly or radially, and but little if at all longitudinally, preferably by inflating them with air; and settling the two together upon the mandrel without any appreciable lengthwise stretch or tension. Such little lengthwise change as there may be is at least uniformly distributed over the entire surface of the tube, so that the gasket rings when cut from the uniformly disposed material are regular and uniform in cross section, not only as between the different gaskets but also as between the different portions of the same gasket.

The difficulty referred to as incidental to the removal of the cut gaskets is in this invention obviated by expanding the sleeve, preferably by inflating it and removing it with its cut gaskets bodily from the mandrel, after which the sleeve is collapsed or contracted and the cut gaskets are freely removed.

Figure 2:
Figure 3:
Figure 4:
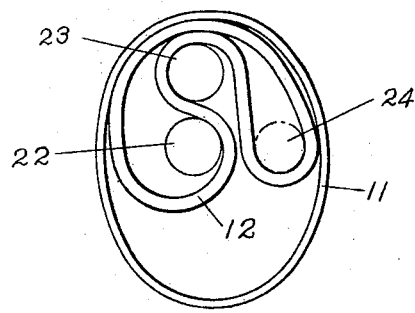
Figure 5:
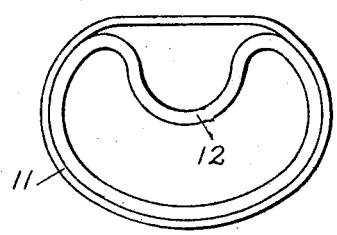
Figure 6:
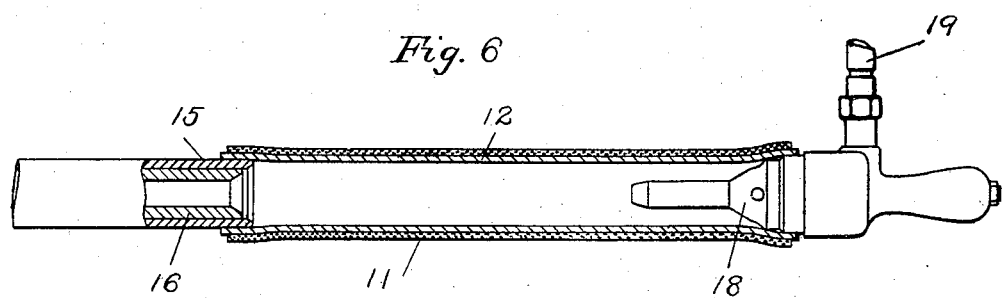

Figure 1 of the drawings is a side view of a gasket of the character herein referred to as having acute angled edges, and as presenting in a marked degree the difficulties which are overcome by this invention. Fig. 2 is an edge view projected from Fig. 1. Fig. 3 is an edge view in section taken on the line 3—3 of Fig. 1, showing the cross-sectional contour of these angular edged gaskets. Fig. 4 is an end view of a tube of gasket material having within it a flexible sleeve, the sleeve being here shown in a collapsed and contracted condition, to permit of being readily assembled with the tube. Fig. 5 is an end view similar to that of Fig. 4, and showing the same parts; but with the sleeve released from its contracted condition, ready to be applied to the mandrel. Fig. 6 is a side view in reduced scale in section taken through the longitudinal center of the tube and sleeve of Figs. 4 and 5, showing them in connection with the end of a mandrel and an inflating nozzle, ready for the operation of expanding the tube and sleeve preparatory to pushing them upon the mandrel. Fig. 7 is a sectional side view, in a general way similar to that of Fig. 6, but showing the parts in the position occupied by them when the tube and sleeve are in place upon the mandrel, but before withdrawing the inflating nozzle. Fig. 8 is a side view and Fig. 9 an end view of the mandrel of the preceding figures, with the sleeve and tube mounted thereon. In Fig. 8 a portion of the left hand end of the tube and sleeve is shown in section, while a portion of the right hand end of the tube is shown as being cut into gaskets, the lines of cut being represented by equally spaced vertical lines. Fig. 10 is a side view illustrating the operation of removing the sleeve with its gaskets thereon from the mandrel, employing the inflating nozzle of Figs. 6 and 7. Figs. 11, 12 and 13 are views illustrating the operation of removing the cut gaskets from the sleeve, these views being drawn on a scale corresponding with that of Figs. 4 and 5. Fig. 11 is an end view representing the form commonly taken by the sleeve and its gaskets when removed from the mandrel and released from the inflating nozzle. Fig. 12 is an end view, showing the form to which the sleeve is preferably collapsed to facilitate the removal of the gaskets, that collapsed form being substantially like the form in which the sleeve is shown in Fig. 4. Fig. 13 is a side view of a portion of the sleeve and gaskets of Fig. 12, serving in conjunction with Fig. 12 to illustrate the free condition of the gaskets relative to the sleeve.

The gaskets 10 are of an improved form, and are the subject matter of U. S. Patents Nos. 826,104 and 826,105. Their form increases their usefulness as sealing instrumentalities without sacrificing the advantage of being economically cut from long tubes of gasket material. It should, however, be understood that this invention is adapted to the manufacture of gaskets having rectangular cross-section as well as to those having acute angled sections like the gasket 10, that gasket being herein illustrated because of the greater difficulty of removing a number of them together from the mandrel by former methods due to the greater tendency of the interlapped conical edges of the gaskets to wedge and cling together, thereby offering greater resistance to removal than in the case of a rectangular form of gasket. The tubes from which these gaskets are made are of any convenient length, suited to the length of the mandrel or of the machine, in which the cutting operation is to be performed. In the practice of the present invention, a length of about eighteen inches is found to be the most convenient length for the tube, although the present method is by no means limited to tubes of that length.

The sleeves 12 are for convenience preferably made slightly longer than the tubes 11, and are also preferably beveled inwardly at one or both ends. They may be made of uncured or cheap grades of rubber, which, however, should be free from minerals or other substances which would have the tendency to dull the edge of the cutter.

According to my improved method a gasket tube 11 is placed upon a sleeve 12, the latter being first contracted, preferably by coiling it to the condition shown in Fig. 4. This contracting may be done by hand, or by means of special apparatus, which coils the sleeve to the form shown, or to some other collapsed or contracted form which permits the tube 11 to be readily slipped to place upon the sleeve as shown in Fig. 4, without any distortion or unequal strain or tension in or between the tube and sleeve. The sleeve is then released and expands as far as may be permitted by the tube 11, which may be as shown in Fig. 5, or some other form, depending upon the relative sizes, thicknesses and resistances of the sleeve 12 and the gasket tube 11. Generally speaking I prefer to make them about in the proportion shown in Fig. 5, with the inside of the gasket tube somewhat smaller in circumference than the outside of the sleeve. One end of the assembled tube and sleeve is then pushed upon a mandrel 15, held by a support 16, thus closing that end of the tube and sleeve. The other end of the tube is similarly closed by means of an inflating nozzle 18, which is connected by means of the pipe 19, with an air pressure reservoir, which upon being admitted through the nozzle inflates the sleeve and the tube until the interior diameter of the lining equals the diameter of the mandrel 15, thereby allowing the air to escape over the mandrel surface. By clasping the upper end of the sleeve around the nozzle with his hand the operator prevents the escape of the air at that end. Being thus expanded free from the mandrel and with a film of air between their surfaces, the sleeve is readily pushed from the position shown in Fig. 6 to that shown in Fig. 7 by a following movement of the nozzle in the hands of the operator. The expansive action of the air changes the tube and the sleeve only or mainly in respect of their diameter or circumference, there being no portion of their surface on which the air pressure can act to change them in a longitudinal direction, the air being free to escape longitudinally, after having expanded the cover circumferentially to the size of the mandrel. The inflating nozzle is then withdrawn and the mandrel 15 with the tube and sleeve mounted thereon is removed from its support and mounted for rotation upon centers 20 as shown in Fig. 8, or upon a spindle or in any other convenient way, the mandrel being rotated while the knife 21 is pushed through the wall of the tube at the desired angle. Or, the mandrel may be held stationary and the knife 21 be mounted in a rotating carrier. These cuts are repeated at the desired intervals longitudinally of the tube, to make the gaskets of the required thickness. After the full length of the tube has thus been cut into gaskets the mandrel is removed from its centers or other supporting means, and placed again upon a support like the support 16; and the inflating nozzle is again inserted, all in the manner shown in Fig. 7. Upon admitting the air pressure it expands the sleeve as before, freeing it from the mandrel throughout the entire length of the sleeve, whereupon the sleeve with the cut gaskets remaining upon it are withdrawn from the mandrel as shown in Fig. 10, by the hand of the operator, who preferably during the withdrawing operation clasps the upper end of the sleeve with his hand to hold it to the nozzle. The inflating nozzle is then withdrawn from the sleeve, which is then contracted or collapsed, as indicated in Figs. 11, 12 and 13. A convenient way of collapsing the sleeve is by means of holding-rods 22 and 23 which support the sleeve while the movable rod 24 is inserted as shown by dot-and-dash line in Fig. 11, and carried to the position shown in Fig. 12, which facilitates the collapsing of the tube to the position shown in the latter figure. The gaskets 10 are thus entirely released from the sleeve, and may be freely withdrawn therefrom.

In the case of gaskets which are unlike on their opposite edges, as illustrated by the gaskets 10, and which are intended to seat in a particular way on their closure joints, it is important to secure the gaskets together in the position in which they are cut, with their similar edges all facing the same way, since in the operation of applying these gaskets upon the jars or other closures on which they are used, the operator should, in order to enable him to work expeditiously, be relieved from the delay of examining each individual gasket, and to face it the right way upon its seat on the receptacle. Therefore, in the manufacture of such gaskets, it is desirable to secure the gaskets together in the position in which they were cut; and before removing them from the sleeve, so as to preclude all possibility of reversing some of them relative to the others. The collapsing of the tube, according to the present invention permits the introduction of a holding member such as a string 25 or a rod or wire, as shown in Figs. 12 and 13, longitudinally through the inside of the series of gaskets which thus may be fastened together in bunches of any convenient size or number by securing the ends of the string or wire together. As these bunches of gaskets come to the user he has only to place the bunch upon his table or upon a post, with the proper face downwardly, to insure that each individual gasket of the bunch will face in the same direction, thereby insuring the proper placing of the gaskets relative to the closure joints in which they are to be used.

The sleeve may be contracted in various ways; and by different appliances. For example, if the material of which the sleeve is made is sufficiently compressible that material itself may be compressed or contracted bodily by means of suction devices, without necessarily disposing the wall in an undulatory or corrugated contour. It may also be contracted by holding one end of the sleeve and turning the other end so as to twist the tube, as in the well-known operation of wringing water out of a piece of cloth by hand. The important feature relative to this process is that this sleeve may be contracted in any convenient or advantageous way sufficiently to enter the gasket tube freely, without stretching the tube, at least longitudinally. I prefer, however, to coil the tube in its contracted condition as herein shown.

The terms "settle" and "settling" as herein employed relate to the action of the sleeve and gasket tube in contracting upon and around the mandrel in a condition substantially free from lengthwise stretch or compression, and particularly from unequal stretch or compression when the air pressure is released.

I claim as my invention:—

1. In the manufacture of ring gaskets, the process of mounting a tube of gasket material evenly upon a mandrel, which consists in assembling the tube and a flexible sleeve or lining, then expanding the two together, and settling them together upon the mandrel.

2. In the manufacture of ring gaskets, the process of mounting a tube of gasket material upon a mandrel, with an intervening flexible sleeve, which consists in first assembling the tube and its sleeve apart from the mandrel, and then expanding the two together and settling them together upon the mandrel.

3. The process of manufacturing ring gaskets, which consists in inserting a flexible sleeve in a tube of gasket material, expanding and settling them both together upon a mandrel, cutting the tube into gaskets, and then removing the sleeve and the cut gaskets together from the mandrel.

4. The process of manufacturing ring gaskets which consists in mounting a tube of gasket material upon a flexible sleeve by contracting the sleeve, expanding the sleeve and the tube together and settling them together upon a mandrel, cutting the tube into gaskets, and then removing the sleeve and the cut gaskets together from the mandrel.

5. The process of manufacturing ring gaskets, which consists in inserting a flexible sleeve within a tube of gasket material, expanding the two together and putting them upon a mandrel of a diameter larger than the interior of the combined tube and sleeve when unexpanded, cutting the tube into gaskets, and then removing the sleeve and the cut gaskets together from the mandrel.

6. The process of manufacturing ring gaskets, which consists in inserting a flexible sleeve within a tube of gasket material, inflating them and putting them upon a mandrel having a diameter larger than the internal diameter of the assembled tube and sleeve when uninflated, cutting the tube into gaskets, and then removing the sleeve and the cut gaskets together from the mandrel.

7. The process of manufacturing ring gaskets, which consists in contracting a flexible sleeve and placing thereon a tube of gasket material having an interior diameter smaller than the outer diameter of the uncontracted sleeve, inflating and settling the two together upon a mandrel having a diameter larger than the internal diameter of the assembled tube and sleeve when uninflated, cutting the tube into gaskets, and then removing the sleeve and the cut gaskets from the mandrel.

8. The process of manufacturing ring gaskets, which consists in inserting a flexible sleeve within a tube of gasket material, placing them upon a mandrel by slipping one end of the sleeve upon the mandrel and inflating the two together from the opposite end of the sleeve, and pushing them upon the mandrel with a following movement of the inflating means, cutting the tube into gaskets, and then removing the sleeve and the cut gaskets together from the mandrel.

9. The process of manufacturing ring gaskets, which consists in inserting a flexible sleeve within a tube of gasket material, closing the ends of the sleeve to facilitate inflation by slipping one end of the sleeve upon a mandrel and inserting an inflating nozzle at the opposite end of the sleeve, inflating the sleeve through the nozzle and pushing it with its tube upon the mandrel by a following movement of the inflating nozzle, cutting the tube into gaskets and then removing the sleeve and the cut gaskets together from the mandrel.

10. The process of manufacturing ring gaskets, which consists in inserting a flexible sleeve in a tube of gasket material, expanding and settling them both together upon a mandrel, cutting the tube into acute angled gaskets by means of a peripheral cut penetrating the wall of the tube at an acute angle with the longitudinal center of the mandrel, and then removing the sleeve and the cut gaskets together from the mandrel.

11. In the manufacture of ring gaskets from a tube of gasket material mounted upon a mandrel, with an intervening flexible removable sleeve, the process of removing the gaskets, which consists in expanding the sleeve and the cut gaskets relative to the mandrel and withdrawing them together from the mandrel.

12. In the manufacture of ring gaskets from a tube of gasket material mounted upon a mandrel with an intervening flexible removable sleeve, the process of removing the gaskets, which consists in inflating the sleeve with the cut gaskets thereon, removing them from the mandrel, and then contracting the sleeve to release the gaskets.

13. The process of manufacturing ring gaskets, which consists in mounting a tube of gasket material around a removable sleeve upon a mandrel, cutting the tube into gaskets; and then removing the sleeve with the cut gaskets thereon from the mandrel.

14. The process of manufacturing ring gaskets, which consists in mounting a tube of gasket material upon a mandrel with a removable sleeve within the tube and around the mandrel, cutting the gaskets apart, and then removing the sleeve with its cut gaskets thereon from the mandrel by expanding the sleeve.

15. The process of manufacturing ring gaskets, which consists in mounting an expansible sleeve upon a mandrel with a tube of gasket material around the sleeve, separating the tube into gaskets, and then removing the sleeve with the cut gaskets thereon from the mandrel by inflating the sleeve and sliding it from the mandrel.

16. The process of manufacturing ring gaskets, which consists in mounting a tube of gasket material upon a mandrel, with an expansible movable sleeve within the tube and around the mandrel, separating the tube into gaskets, then removing the sleeve with its gaskets thereon from the mandrel by directing air pressure into one end of the sleeve around the mandrel, while withdrawing the sleeve from the mandrel.

17. The process of manufacturing ring gaskets which consists in mounting an expansible sleeve with a tube of gasket material thereon upon a mandrel, separating the tube into gaskets, withdrawing the sleeve with its cut gaskets thereon from the mandrel, and then contracting the sleeve to facilitate the removal of the cut gaskets therefrom.

18. The process of manufacturing ring gaskets, which consists in contracting a flexible sleeve, mounting a tube of gasket material thereon, expanding the sleeve and the tube together, and settling them upon a mandrel, separating the tube into gaskets, then expanding the sleeve and the cut gaskets together and removing them from the mandrel, then collapsing the sleeve and removing the cut gaskets therefrom.

19. The process of manufacturing ring gaskets, which consists in collapsing a flexible sleeve, placing a tube of gasket material thereon, and expanding the two together, and settling them upon a mandrel of a diameter larger than the interior diameter of the combined tube and sleeve when unexpanded, cutting the tube into gaskets, expanding the tube and the cut gaskets together and removing them together from the mandrel, and then collapsing the sleeve and removing the cut gaskets therefrom.

20. In the manufacture of ring gaskets from tubes of gasket material, the herein described sub-process of securing cut gaskets against reversal relative to each other, which consists in threading a holding member through the insides of the gaskets prior to removing them from the sleeve.

In testimony whereof I have signed my name to this specification in the presence of two subscribing witnesses.

JOSEPH MERRITT.

Witnesses:
NELLIE PHOENIX,
CAROLINE M. BRECKLE.